US008652427B2

(12) United States Patent
Liu et al.

(10) Patent No.: US 8,652,427 B2
(45) Date of Patent: Feb. 18, 2014

(54) PREPARATION AND REPEATED REGENERATION OF MATERIAL CONTAINING AMORPHOUS IRON OXIDE HYDROXIDE, DESULFURIZATION AGENTS CONTAINING THE MATERIAL, AND PREPARATION AND REPEATED REGENERATION THEREOF

(75) Inventors: Zhenyi Liu, Beijing (CN); Yongsheng Yu, Beijing (CN); Ke Lin, Beijing (CN)

(73) Assignee: Beijing Sanju Environmental Protection and New Material Co., Ltd., Beijing (CN)

( * ) Notice: Subject to any disclaimer, the term of this patent is extended or adjusted under 35 U.S.C. 154(b) by 0 days.

(21) Appl. No.: 13/174,743

(22) Filed: Jun. 30, 2011

(65) Prior Publication Data

US 2011/0260102 A1 Oct. 27, 2011

Related U.S. Application Data

(63) Continuation of application No. PCT/CN2009/001596, filed on Dec. 30, 2009.

(30) Foreign Application Priority Data

Dec. 30, 2008 (CN) .......................... 2008 1 0247534
Dec. 30, 2008 (CN) .......................... 2008 1 0247536
May 31, 2009 (CN) .......................... 2009 1 0086346
May 31, 2009 (CN) .......................... 2009 1 0086349

(51) Int. Cl.
*C01G 49/00* (2006.01)

(52) U.S. Cl.
USPC ........................................ 423/140; 423/632

(58) Field of Classification Search
USPC ............................ 423/632, 140–147; 106/456
See application file for complete search history.

(56) References Cited

U.S. PATENT DOCUMENTS

| 7,037,876 | B2 | 5/2006 | O'Brien et al. | |
| 7,717,979 | B2 | 5/2010 | Liu et al. | |
| 2005/0123470 | A1 | 6/2005 | Ayyer et al. | |
| 2005/0247636 | A1 | 11/2005 | Schlegel | |
| 2008/0047395 | A1* | 2/2008 | Liu et al. | 75/319 |
| 2008/0241055 | A1 | 10/2008 | Kawase et al. | |
| 2009/0169470 | A1* | 7/2009 | Kawase | 423/633 |

FOREIGN PATENT DOCUMENTS

| CN | 1121950 | 5/1996 |
| CN | 1133817 | 10/1996 |
| CN | 1034422 | 4/1997 |
| CN | 1312132 | 9/2001 |
| CN | 1368537 | 9/2002 |
| CN | 1114462 | 7/2003 |
| CN | 1136045 | 1/2004 |
| CN | 1539545 | 10/2004 |
| CN | 1704144 | 12/2005 |
| CN | 101070491 | 11/2007 |
| CN | 101584962 | 5/2008 |
| CN | 101585556 | 11/2009 |
| CN | 101585557 | 11/2009 |
| CN | 101767828 | 7/2010 |
| EP | 0215505 | 3/1987 |
| EP | 0628339 | 6/1994 |
| EP | 1857414 | 11/2007 |
| GB | 838571 | 6/1960 |
| JP | 59039345 | 3/1984 |
| JP | 6262066 | 9/1994 |
| JP | 10259026 | 9/1998 |
| WO | WO 2006088083 | 8/2006 |
| WO | WO 2009/150232 | 12/2009 |
| WO | WO 2010081290 | 7/2010 |

OTHER PUBLICATIONS

Response filed Feb. 15, 2013 for U.S. Appl. No. 13/172,898.
Response filed Feb. 28, 2013 for U.S. Appl. No. 13/172,893.
Gong Zhi-jian et al., "Research on Desulfurization Activity of Iron Oxyhydroxide Prepared with Different Alkali Ratios", *Coal Science and Technology*, 34(10): 44-46 (2006).
Gong Zhi-jian et al., "Research on Desulfurization Activity of Iron Oxide Hydroxides Prepared with Different Methods", *Coal Conversion*, 29 (3):71-74 (2006).
Liu and Liu, "The Characterization of an Active Components in a kind of Iron Oxides Desulfurizer with High Sulfur Capacity",National Information Center of Gas Purification Proceedings on Technical Seminar. 2006, pp. 107-111,.
Office Action mailed May 3, 2012, for U.S. Appl. No. 13/172,893.
Response filed Nov. 5, 2012 for U.S. Appl. No. 13/172,893.
Final Office Action mailed Nov. 29, 2012 for U.S. Appl. No. 13/172,893.
Office Action mailed Aug. 16, 2012 for U.S. Appl. No. 13/172,898.
Office Action mailed Aug. 28, 2012 for U.S. Appl. No. 12/769,761.
Response filed Sep. 27, 2012 for U.S. Appl. No. 12/769,761.
Office Action mailed Oct. 12, 2012 for U.S. Appl. No. 12/769,761.
Response filed Feb. 12, 2013 for U.S. Appl. No. 12/769,761.
Office Action mailed Jun. 12, 2012 for U.S. Appl. No. 13/174,728.
Response filed Jul. 18, 2012 for U.S. Appl. No. 13/174,728.
Office Action mailed Jul. 27, 2012 for U.S. Appl. No. 13/174,728.
Response filed Jan. 23, 2013 for U.S. Appl. No. 13/174,728.

(Continued)

*Primary Examiner* — Steven Bos
(74) *Attorney, Agent, or Firm* — Womble Carlyle Sandridge & Rice, LLP

(57) ABSTRACT

Method for preparing material containing amorphous iron oxide hydroxide, the method including: mixing an aqueous ferrous salt solution and hydroxide solution or solid hydroxides at the temperature of below 70° C., filtering the reaction solution, washing the filter cake, preparing suspension solution of the filter cake, blowing an oxygen-containing gas into the suspension solution to oxidize the ferrous iron, and then filtering and drying. The material after being used as desulfurization agent can be repeatedly regenerated through oxidation in an oxygen-containing gas. A desulfurization agent, and methods for preparation and repeated regeneration thereof. The desulfurization agent contains the material and organic binders, and may also include a small amount of additives. The organic binders are selected from sodium carboxymethyl cellulose, sesbania powder, and cellulose powder, and the additives are selected from sawdust, rice husk power, and bran.

11 Claims, No Drawings

(56) References Cited

OTHER PUBLICATIONS

Office Action mailed Mar. 31, 2009 for U.S. Appl. No. 11/805,727.
Response filed Jun. 30, 2009 for U.S. Appl. No. 11/805,727.
Final Office Action mailed Oct. 28, 2009 for U.S. Appl. No. 11/805,727.
Response to Final Office Action filed Dec. 14, 2009 for U.S. Appl. No. 11/805,727.
Notice of Allowance for U.S. Appl. No. 11/805,727 mailed Jan. 7, 2010.
Issue Fee Transmittal for U.S. Appl. No. 11/805,727 filed Apr. 7, 2010.
Issue Notification for U.S. Appl. No. 11/805,727, mailed Apr. 28, 2010.
Supplementary European Search Report and Search Opinion for EPO application No. 09845385.5, dated Nov. 5, 2012.
Eurasian Patent Office Action dated Feb. 15, 2013, for EA application No. 201171473.
Multiple-Site Adsorption of Cd, Cu, Zn, and Pb on Amorphous Iron Oxyhydroxide, Mark M. Benjamin and James O. Leckie, "Journal of Colloid and Interface Science," vol. 79, No. 1, Jan. 1981.
European Extended Search Report for application No. PCT/CN2009001598, dated Jun. 25, 2012.
European Extended Search Report for application No. PCT/CN2009001597, dated May 28, 2012.
European Extended Search Report for application No. PCT/CN2009001596, dated Jun. 25, 2012.
European Extended Search Report for application No. PCT/CN2009001595, dated Jun. 25, 2012.
European Extended Search Report for application No. PCT/CN2009001594, dated Nov. 11, 2012.
Eurasian Patent Office Action dated Feb. 15, 2013, for EA application No. 201170905.
Eurasian Patent Office Action dated Mar. 21, 2013, for EA application No. 201170839.
Eurasian Patent Office Action dated Jan. 17, 2013, for EA application No. 201170904.
Eurasian Patent Office Action dated Jan. 17, 2013, for EA application No. 201170903.

\* cited by examiner

PREPARATION AND REPEATED REGENERATION OF MATERIAL CONTAINING AMORPHOUS IRON OXIDE HYDROXIDE, DESULFURIZATION AGENTS CONTAINING THE MATERIAL, AND PREPARATION AND REPEATED REGENERATION THEREOF

CROSS-REFERENCE TO RELATED APPLICATIONS

This application is a continuation of International Patent Application No. PCT/CN2009/001596, with an international filing date of Dec. 30, 2009, designating the United States, now pending, and further claims priority benefits to Chinese Patent Application No. 200810247534.9, filed Dec. 30, 2008, Chinese Patent Application No. 200810247536.8, filed Dec. 30, 2008, Chinese Patent Application No. 200910086346.7, filed May 31, 2009, and Chinese Patent Application No. 200910086349.0, filed May 31, 2009. The contents of all of the aforementioned applications, including any intervening amendments thereto, are incorporated herein by reference.

BACKGROUND OF THE INVENTION

1. Field of the Invention

This invention relates to methods for preparing the composition containing amorphous iron oxide hydroxide, the desulfurizer comprising the same, and methods for preparing and regenerating the desulfurizer.

2. Description of the Related Art

Sulfide is produced in many industrial occasions, such as process of producing chemical raw materials from coal or oil, waste water, or gas in the industrial emissions. Wherein, there are lots of sulfur-containing substances in the raw materials. And hydrogen sulfide can be discharged from these sulfur-containing substances during the process of production, so as to result in catalyst deactivation in the subsequent production. Also, hydrogen sulfides in the waste water or gas will cause environmental pollution, or poisoning of human and animal if discharged without any treatment.

In order to effectively reduce sulfide especially to minimize the effects of sulfide on the industrial production and the environment, researchers pay enough attention to the research and development of the desulfurizer. There are lots of desulfurizer for removal of hydrogen sulfide in the existing technologies, and a traditional and important one is the iron series desulfurizer which is produced by mainly using iron oxides as the active ingredients of the desulfurizer, wherein iron oxides includes ferroferric oxide and iron oxide hydroxide (FeOOH). However, the iron series desulfurizer in the existing technologies has a shortcoming that sulfur capacity is not high enough. In addition, the used desulfurizer in the existing technologies (including iron series desulfurizer) cannot be regenerated or is difficult to be regenerated, so that lots of waste agents have to be landfilled, and this may cause waste of reusable resources in used desulfurizer and environmental pollution.

Because of the good desulphurization property, iron oxide hydroxide is widely used as desulfurizer in chemical field. In addition, the preparation method for amorphous iron oxide hydroxide is a laboratory method, which needs to be protected with nitrogen and the method is relatively complicated.

In the existing technology, especially in the industrial application, there is very few desulfurizer of amorphous iron oxide hydroxide used. Even if there exists the desulfurizer of amorphous iron oxide hydroxide in the market, the content of amorphous iron oxide hydroxide is low (less than 40%), and the content of iron oxides which cannot be regenerated is high, such as ferroferric oxide, ferric oxide or iron oxide hydroxide in other crystalline state. This causes poor desulfurization property of amorphous iron oxide desulfurizer, and further causes the desulfurizer not to be regenerable, or no use value even if it can be regenerated.

The final objectives of this study are to achieve the mass production of amorphous iron oxide hydroxide with high purity and sulfur capacity, and even regeneration of used amorphous iron oxide hydroxide in industrial production. If these two objectives can be achieved, it will be a significant revolution in the desulfurizer field and the two following shortcomings of the existing desulfurizer can be eliminated. (1) Because the preparation of iron oxide hydroxide is closely related to the reaction conditions such as pH value, temperature, and oxide, iron oxides (such as ferroferric oxide, ferric oxide) or iron oxide hydroxide in different crystalline states can be obtained through different preparation methods. The content of amorphous iron oxide hydroxide in the product is low (lower than 40%) so the product has low sulfur capacity and cannot be regenerated; (2) In the existing technology, the other kinds of desulfurizers cannot be regenerated or the regeneration cost is very high, so lots of waste agent has to be landfilled, and this may cause waste of reusable resources in used desulfurizer and environmental pollution.

SUMMARY OF THE INVENTION

In view of the above-described problems, it is one objective of this invention to provide a method for preparing a composition comprising highly concentrated amorphous iron oxide hydroxide that is suitable for mass production.

It is another objective of this invention to provide a method for regenerating the composition of the amorphous iron oxide hydroxide after being used as a desulfurizer.

Another objective of this invention is to provide a desulfurizer that has a high sulfur capacity and can be regenerated.

An further objective of this invention is to provide a method for preparing the desulfurizer.

The final objective of this invention is to provide a method for regenerating the desulfurizer.

In order to achieve the above mentioned objectives, firstly, a material or composition comprising high purity and sulphur capacity amorphous iron oxide hydroxide can be massively manufactured, and also the waste agent generated after the desulfurzier is used should be quickly regenerated and the elemental sulphur generated during the process of regeneration can be recycled, finally, the material or composition regenerated after the elemental sulphur is removed can be used to produce a desulfurizer with high sulphur capacity.

In order to achieve the above mentioned objectives, this invention provides a method for preparing a composition comprising amorphous iron oxide hydroxide, the method comprising the following steps:

a. preparing a solution with solid soluble ferrous salt;
b. mixing the solution with solid soluble ferrous salt with a hydroxide solution prepared or a solid hydroxide into a first mixture, allowing the first mixture to react at a reaction temperature not exceeding 70° C. to yield a second mixture;
c. filtering the second mixture to yield a filter cake, and washing the filter cake with water; and
d. preparing the filter cake into a suspension, charging the suspension with a gas containing oxygen, then filtering the suspension and drying to yield a mixture containing the amorphous iron oxide hydroxide.

The hydroxide in the step b is a hydroxide of group IA elements.

The pH value of the solution in step b is 7.5-8.5 at the end of reaction.

The reaction temperature in step b does not exceed 50° C.

In step c, the filter cake is washed with water, allowing the weight proportion of ion of the group IA elements to be less than 0.5%.

In step d, the weight proportion of the solid in the suspension prepared is 5-30%.

In step d, the weight proportion of solid in the suspension prepared is 10-15%.

The drying temperature in step d does not exceed 100° C.

The gas containing oxygen in step d is air.

In step d, charging the suspension with a gas containing oxygen until the weight proportion between the ferrous ion and Ferrum element is less than 1%.

An composition comprising the amorphous iron oxide hydroxide prepared by the method mentioned above, wherein, the weight proportion of the amorphous iron oxide hydroxide in the composition is 65-100%, and the other ingredients are water and byproduct after reaction.

The hydroxide in the b is a hydroxide of group IIA element when it is solid, meanwhile, in step c, the filter cake is washed with water, allowing the weight proportion of ion of the group IIA elements to be less than 0.5%.

A method for regenerating a composition comprising amorphous iron oxide hydroxide after the composition is used as a desulfurizer, the method comprising the following steps:
  (a) grinding the waste mixture resulting from the use of the desulfurizer into a waste powder;
  (b) preparing the waste powder into a suspension and charging with a gas containing oxygen to obtain a slurry comprising amorphous iron oxide hydroxide and elemental sulfur; and
  (c) filtering the slurry to yield a solid and extracting the elemental sulfur from the solid using a solvent; and adding the organic binder or the organic binder and the additive to the solid to yield the desulfurizer.

Regeneration of the composition comprising amorphous iron oxide hydroxide is the regeneration of the amorphous iron oxide hydroxide according to the chemical reaction: $2FeOOH+3H_2S \rightarrow Fe_2S_3 \cdot H_2O+3H_2O$, $Fe_2S_3 \cdot H_2O+3/2 O_2 \rightarrow 2FeOOH+3S$.

In a class of this embodiment, prior to grinding in step (a), the waste mixture is washed with water.

In a class of this embodiment, in step (c), the extracted solution is concentrated to yield crystalline elemental sulfur.

In a class of this embodiment, in step (b), the weight percent of the solid in the suspension is 5-30%, particularly 10-15%.

In a class of this embodiment, the gas containing oxygen in step (b) is air.

In a class of this embodiment, the solvent in step (c) is a non-polar solvent, either carbon tetrachloride or carbon disulfide.

In a class of this embodiment, the waste mixture in step (a) is ground into particles of size 100-400 mesh, particularly 200 mesh.

A method is provided for regenerating the composition comprising amorphous iron oxide hydroxide after being used as a desulfurizer. The method of regeneration comprises the steps:
  (1) grinding the waste mixture resulting from the use of the composition comprising amorphous iron oxide hydroxide as desulfurizer into a waste powder;
  (2) preparing the waste powder into a suspension and charging with a gas containing oxygen to obtain a slurry comprising amorphous iron oxide hydroxide and elemental sulfur; and
  (3) placing the slurry or solid resulting from filtering of the slurry into a reactor and charging the slurry with air so that the elemental sulfur floats and the amorphous iron oxide hydroxide precipitates.

In a class of this embodiment, prior to grinding in step (1), the waste mixture is washed with water.

In a class of this embodiment, after step (3), the method includes separation of the floated elemental sulfur.

In a class of this embodiment, in step (2), the weight percent of the solid in the suspension is 5-30%, particularly 10-15%.

In a class of this embodiment, the gas containing oxygen in step (2) is air.

In a class of this embodiment, an auxiliary agent is added to the reactor to accelerate the floating of the elemental sulfur, the auxiliary agent being water glass and kerosene.

In a class of this embodiment, the reactor in step (3) is a flotation tank.

In a class of this embodiment, in step a, the waste mixture is ground into particles of size 100-400 mesh, particularly 200 mesh.

A desulfurizer comprising a composition comprising amorphous iron oxide hydroxide and an organic binder, wherein the composition comprising amorphous iron oxide hydroxide is prepared according to the following steps:
  (i) preparing a solution with solid soluble ferrous salt;
  (ii) mixing the solution with solid soluble ferrous salt with a hydroxide solution prepared or a solid hydroxide into a first mixture, allowing the first mixture to react at a reaction temperature not exceeding 70° C. to yield a second mixture;
  (iii) filtering the second mixture to yield a filter cake; and
  (iv) charging the filter cake with a gas containing oxygen to yield a mixture containing the amorphous iron oxide hydroxide.

The desulfurizer further comprises an additive.

The desulfurizer comprising 88-93 wt. % of the composition comprising amorphous iron oxide hydroxide and 7-12 wt. % of the organic binder.

The desulfurizer comprising 88-92 wt. % of the composition comprising amorphous iron oxide hydroxide and 7-11 wt. % of the organic binder, and 1-5 wt. % of the additive.

The organic binder is sodium carboxymethyl cellulose, sesbania powder, cellulose powder, or a mixture thereof. The additive is sawdust powder, rice hull powder, wheat bran powder, or a mixture thereof.

In a class of this embodiment, in step (i), the solid hydroxide is a hydroxide of Group IA or Group IIA elements. In step (ii), the pH value of the solution in step (ii) is 7.5-8.5 at the end of reaction. The reaction temperature in step (ii) does not exceeding 50° C.

In a class of this embodiment, in step (ii), the amorphous iron oxide hydroxide can also be prepared when the reaction temperature is 70-90° C. However, the content of amorphous iron oxide hydroxide in the composition is relatively low.

In a class of this embodiment, in step (iv), the filter cake is prepared into a suspension, the suspension is charged with a gas containing oxygen, then filtered and dried, in order to yield a mixture containing the amorphous iron oxide hydroxide. In this step, the filter cake is washed with water, allowing the weight proportion of ion of the group IA or IIA elements to be less than 0.5%; the weight proportion of the solid in the suspension prepared is 5-30%, preferably 10-15%; in this step, the suspension is charged with a gas containing oxygen until the weight proportion between the ferrous ion and Ferrum element is less than 1%; and the drying is conducted at temperature which does not exceed 100° C.

In step (iv), the filter cake obtained after step (iii) is naturally oxidized in the air, then the filter cake is washed with water, filtered, then dried to yield a mixture containing the amorphous iron oxide hydroxide. In this step, the filter cake is naturally oxidized until the weight proportion between the ferrous ion and Ferrum element is less than 1%; in this step, the weight proportion of the ion of Group IA or IIA elements in the mixture washed with water is less than 1%; and the drying is conducted at temperature which does not exceed 100° C.

A method for preparing the desulfurizer comprising the following steps:
  (I) mixing the composition containing amorphous iron oxide hydroxide with organic binder into a mixture, or mixing the composition containing amorphous iron oxide hydroxide with organic binder and addictive into a mixture;
  (II) shaping the mixture into a strip, a ball, or a pill; and
  (III) naturally drying the strip, the ball, or the pill at temperatures between −5° C. and 45° C., or roasting the strip, the ball, or the pill at temperatures between 60° C. and 90° C. to yield the desulfurizer.

Regeneration of the desulfurizer is the regeneration of the amorphous iron oxide hydroxide as described in the chemical equation: $2FeOOH+3H_2S \rightarrow Fe_2S_3 \cdot H_2O+3H_2O$, $Fe_2S_3 \cdot H_2O+3/2O_2 \rightarrow 2FeOOH+3S$.

A method is provided for regenerating the desulfurizer, includes the following steps:
  a) grinding the waste mixture resulting from the use of the desulfurizer into a waste powder;
  b) preparing the waste powder as a suspension and charging the suspension with a gas containing oxygen to obtain a slurry comprising amorphous iron oxide hydroxide and elemental sulfur; and
  c) placing the slurry or solid resulting from filtering the slurry into a reactor, charging the slurry with air so that the elemental sulfur floats and is separated, collecting the precipitate from the bottom of the reactor, and adding the organic binder or the organic binder and the additive to the precipitate to yield the desulfurizer.

In a class of this embodiment, prior to grinding in step a), the waste mixture is washed with water.

In a class of this embodiment, the method further comprises separating the floated elemental sulfur after step c).

In a class of this embodiment, in step b), the weight percent of solid in the suspension is 5-30%, particularly 10-15%.

In a class of this embodiment, the gas containing oxygen in step b) is air.

In a class of this embodiment, in step c), an auxiliary agent is added to the reactor to accelerate the floatation of the elemental sulfur. The auxiliary agent is water glass and kerosene.

In a class of this embodiment, the reactor is a flotation tank in step c).

In a class of this embodiment, in step a), the waste mixture is ground into particles of size 100-400 mesh, particularly 200 mesh.

A method is provided for regenerating the desulfurizer, comprising the following steps:
  (A) grinding the waste mixture resulting from the use of the desulfurizer into a waste powder;
  (B) preparing the waste powder in a suspension and charging with a gas containing oxygen to obtain a slurry comprising amorphous iron oxide hydroxide and elemental sulfur; and
  (C) filtering the slurry to yield a solid and extracting the elemental sulfur from the solid using a solvent, and adding the organic binder or the organic binder and the additive to the remaining solid to yield the desulfurizer.

In a class of this embodiment, prior to grinding in step (A), the waste mixture is washed with water.

In a class of this embodiment, the extracted solution is concentrated to yield crystalline elemental sulfur in step (C).

In a class of this embodiment, in step (B), the weight percent of the solid in the suspension is 5-30%, particularly 10-15%.

In a class of this embodiment, the gas containing oxygen is air in step (B).

In a class of this embodiment, in step (C), the solvent is a non-polar solvent, either carbon tetrachloride or carbon disulfide.

In a class of this embodiment, in step (A), the waste mixture is ground into particles of size 100-400 mesh, particularly 200 mesh.

In the amorphous iron oxide hydroxide, oxygen atoms are arranged in a cubic close-packed structure, and iron centers are arranged in a tetrahedral or octahedral cavity formed by the oxygen atoms. The two form a short-range ordered and long-range disordered structure, which has good stability combining with sulfur atoms. The amorphous iron oxide hydroxide has a high sulfur capacity and good desulfurization properties.

This invention has the following advantages:
  1. The method for preparing the composition comprising amorphous iron oxide hydroxide is not limited to a laboratory and can be realized by industrial mass production. The resultant composition has a high concentration of amorphous iron oxide hydroxide (65-100%) and a high sulfur capacity (up to 62%) so as to industrialize the mass production of high quality amorphous iron oxide hydroxide and the desulfurizer thereof steadily.
  2. After long term research, by maintaining the reaction temperature below 70° C. (particularly below 50° C.), the main product is amorphous iron oxide hydroxide, and it is guaranteed that no other iron oxides will form, such as ferroferric oxide, ferric oxide, etc. so the stability of production of amorphous iron oxide hydroxide is improved.
  3. In the method of preparing the composition containing amorphous iron oxide hydroxide, the filter cake is prepared into suspension, and then oxidized in the air, so that the process of oxidation can be easily controlled, and good oxidation property can be achieved. In addition, the preferred weight proportion of the solid in the suspension is 10%-15%, and this guarantees the oxidation speed and complete oxidation.
  4. In the method of preparing the composition containing amorphous iron oxide hydroxide, the pH value of the solution at the end of reaction is 7.5-8.5, preferably 8, in order to guarantee the complete sedimentation of ferrous ion in the solution; in addition, the ferrous ion can be easily oxidized into ferric ion, but not ferroferric oxide.
  5. In the method of preparing amorphous iron oxide hydroxide, the drying is conducted at the temperature which does not exceed 100° C., in order to guarantee the minimal production of ferric oxide.
  6. The desulfurizer can optionally comprise an additive selected from the following: sawdust powder, rice hull powder, wheat bran powder, or a mixture thereof, so that the desulfurizer has a loose structure and absorbs sulfide easily.
7. The organic binder selected from sodium carboxymethylcellulose, sesbania powder, cellulose powder, or a mixture thereof. The binder does not cover the surface of the amorphous iron oxide hydroxide. Therefore, the desulfurization activity is not inhibited and the desulfurizer has a high sulfur capacity.
8. The two regeneration methods and the method of preparing the composition comprising amorphous iron oxide hydroxide may allow quick regeneration of waste mixture produced after the use of the composition as desufulrizer, and the composition regenerated still has high sulfur capacity, furthermore, the regenerated composition can also be regenerated after it is used, so that this recycling saves resources and reduces environmental pollution with great economic significance.
9. The method for generating amorphous iron oxide hydroxide further produces elemental sulfur, which optimizes resource utilization.
10. Washing the waste mixture with water prior to grinding can effectively remove impurities that cover the surface of the waste mixture so as not to affect the subsequent reaction.
11. In the regeneration process, oxidation of the suspension by the gas containing oxygen is controllable and has good effects; the weight percent of the solid in the suspension is preferably between 10 and 15%, which guarantees the oxidation speed and complete oxidation.
12. In this invention, the flotation method of mineral processing is applied in regeneration of desulfurizer. The separation of amorphous iron oxide hydroxide from elemental sulfur by flotation is achieved by charging the slurry with air and is a purely physical method. This method is economical and environmentally friendly.
13. The waste mixture is ground into particles of size 100-400 mesh (particularly 200 mesh), which improves oxidation, extraction, and flotation separation.
14. The composition comprising amorphous iron oxide hydroxide can be further used in other fields.

DETAILED DESCRIPTION OF THE EMBODIMENTS

The following implementation examples give a further detailed description of this invention, but are not a limitation of this invention. $Fe_t$-total content of Fe.

EXAMPLE 1

The process for preparing the composition containing amorphous iron oxide hydroxide comprises the following steps:
Firstly, the water solution prepared with 152 g $FeSO_4.7H_2O$ was put in a reactor, and the water solution prepared with 45 g solid NaOH was added to the reactor with stir simultaneously to prepare the water solution; then the reaction temperature was controlled not exceeding 70° C. by controlling the feeding rate of NaOH water solution; after the reaction, the solution in the reactor was filtered, and the filter cake was washed with water until the content of $Na^+$ is less than 0.5%; after that, the filter cake was prepared into water suspension containing 30% solid in weight percentage, and the air was charged into the solution for oxidization until the $Fe^{2+}/Fe_t$ is less than 1%; then the suspension was filtered, and the composition containing amorphous iron oxide hydroxide was obtained after the filtered composition was dried at the temperature of 90° C.; wherein, the weight percentage of the amorphous iron oxide hydroxide was 85%, the other ingredients were $Na_2SO_4$, water and $TiO_2$ ($TiO_2$ was the impurity of the industrial $FeSO_4.7H_2O$), and the sulfur capacity of the composition was 53%. $Fe_t$ was the total content of Ferrum element, and $Fe^{2+}/Fe_t$ was determined via phenanthroline spectrophotometry, the content of $Na^+$ was determined via flame photometry, which were the same in the following embodiments.

The process of method 1 for regeneration the composition after being used for desulfurization is described below:
The composition comprising amorphous iron oxide hydroxide was added to a desulfurization reactor. After $H_2S$ passing through the reactor, the resultant waste mixture was unloaded, washed with water and ground in the presence of water using a wet ball mill into powders of particle size 100 mesh. An aqueous suspension of the powders was prepared with a solid weight percentage of 5%. Compressed air was charged into the suspension and a sample was collected for testing after a period of reaction. When no $H_2S$ was produced from the reaction between the sample and hydrochloric acid, the iron sulfide in the suspension was determined to have completely transformed into a slurry comprising amorphous iron oxide hydroxide and elemental sulfur. The slurry was filtered to yield a solid that was extracted thrice with $CCl_4$. The extract was combined and distilled to yield crystallized elemental sulfur. The solid remaining after extraction was a composition comprising amorphous iron oxide hydroxide. The composition was roasted and could be reused as a desulfurizer. The composition had a sulfur capacity of 50%. After second, third, and fourth rounds of regeneration, the composition had a sulfur capacity of 48%, 46%, and 44%, respectively.

The process of method 2 for regeneration the composition after being used for desulfurization is described below:
The composition comprising amorphous iron oxide hydroxide was added to a desulfurization reactor. After $H_2S$ passing through the reactor, the resultant waste mixture was unloaded, washed with water and ground in the presence of water using a wet ball mill into powders with a particle size of 100 mesh. An aqueous suspension of the powders was prepared with a solid weight percentage of 5%, compressed air was charged into the suspension, and a sample was collected for testing after a period of reaction. When no $H_2S$ was produced from the reaction between the sample and hydrochloric acid, the iron sulfide in the suspension was determined to have been completely transformed into a slurry comprising amorphous iron oxide hydroxide and elemental sulfur. The slurry was filtered to yield a solid that was added to a flotation tank. Water was further added, and air was charged into the slurry. Due to hydrophobicity, the elemental sulfur floated and was removed by overflowing the tank. The precipitate at the bottom of the tank was a composition comprising amorphous iron oxide hydroxide. The elemental sulfur was refined through extraction or other methods. The composition was roasted and could be reused as a desulfurizer. The composition had a sulfur capacity of 52%. After second, third, and fourth rounds of regeneration, the composition had a sulfur capacity of 50%, 48%, and 46%, respectively.

EXAMPLE 2

The process for preparing the composition containing amorphous iron oxide hydroxide comprises the following steps:

Firstly, the water solution prepared with 75 g KOH was put in a reactor, and the water solution prepared with 127 g $FeCl_2 \cdot 4H_2O$ was put into the reactor and the mixture was stirred simultaneously; then the reaction temperature was controlled not exceeding 50° C. by controlling the feeding rate of $FeCl_2$ water solution; after the reaction, the solution in the reactor was filtered, and the filter cake was washed with water until the content of $K^+$ was less than 0.5%; after that, the filter cake was prepared into water suspension containing 15% solid in weight percentage, and the air was charged into the solution for oxidation until the $Fe^{2+}/Fe_t$ was less than 1%, so that it was considered the composition was completed oxidized; then the suspension was filtered, and the composition containing amorphous iron oxide hydroxide was obtained after the filtered composition was dried at the temperature of 100° C.; wherein, the weight percentage of the amorphous iron oxide hydroxide in the filtered composition was 80%, and the other ingredients were KCl, water and unknown impurity; the sulfur capacity of the composition was 50%. Wherein, the content of $K^+$ was determined through flame photometry, which was the same in the following embodiments.

The process of method 1 for regeneration the composition after being used for desulfurization is described below:

The composition comprising amorphous iron oxide hydroxide was added to a desulfurization reactor. After $H_2S$ passing through the reactor, the resultant waste mixture was unloaded, washed with water and ground in the presence of water using a wet ball mill into powders of particle size 200 mesh. An aqueous suspension of the powders was prepared with a solid weight percentage of 10%. Compressed air was charged into the suspension and a sample was collected for testing after a period of reaction. When no $H_2S$ was produced from the reaction between the sample and hydrochloric acid, the iron sulfide in the suspension was determined to have completely transformed into a slurry comprising amorphous iron oxide hydroxide and elemental sulfur. The slurry was filtered to yield a solid that was extracted thrice with $CS_2$. The extract was combined and distilled to yield crystallized elemental sulfur. The solid remaining after extraction was a composition comprising regenerated amorphous iron oxide hydroxide. The composition was roasted and could be reused as a desulfurizer. The composition had a sulfur capacity of 48%. After second, third, and fourth rounds of regeneration, the composition had a sulfur capacity of 46%, 44.5%, and 42%, respectively.

The process of method 2 for regeneration the composition after being used for desulfurization is described below:

The composition comprising amorphous iron oxide hydroxide was added to a desulfurization reactor. After $H_2S$ passing through the reactor, the resultant waste mixture was unloaded, washed with water and ground in the presence of water using a wet ball mill into powders with a particle size of 200 mesh. An aqueous suspension of the powders was prepared with a solid weight percentage of 10%, compressed air was charged into the suspension, and a sample was collected for testing after a period of reaction. When no $H_2S$ was produced from the reaction between the sample and hydrochloric acid, the iron sulfide in the suspension was determined to have been completely transformed into a slurry comprising amorphous iron oxide hydroxide and elemental sulfur. The slurry was added to a flotation tank. Water was added, and water glass and kerosene were further added as auxiliary agents, and air was charged into the slurry. Due to hydrophobicity, the elemental sulfur was removed by overflowing the tank. The precipitate at the bottom of the tank was a composition comprising amorphous iron oxide hydroxide. The composition was roasted and could be reused as a desulfurizer. The composition had a sulfur capacity of 48%. After second, third, and fourth rounds of regeneration, the composition had a sulfur capacity of 46.5%, 45%, and 44%, respectively. The auxiliary agents accelerated the separation of amorphous iron oxide hydroxide and elemental sulfur, the following examples are the same.

EXAMPLE 3

The process for preparing the composition containing amorphous iron oxide hydroxide comprises the following steps:

Firstly, the water solution prepared with $Fe(NO_3)_2 \cdot 6H_2O$ was put in a reactor; the water solution prepared with solid NaOH was further put into the reactor and the mixture was stirred simultaneously; the reaction temperature was controlled between 30° C. and 40° C. by controlling the feeding rate of the solid NaOH; the pH value of the solution at the end of the reaction was kept at 7.5, and after the reaction, the solution in the reactor was filtered, and the filter cake was washed with water until the content of $Na^+$ was less than 0.5%; after that, the filter cake was prepared into water suspension containing 10% solid in weight percentage, and the air was charged into the solution for oxidation until the $Fe^{2+}/Fe_t$ was less than 1%, so that it was considered the composition was completed oxidized; then the suspension was filtered, and the composition containing amorphous iron oxide hydroxide was obtained after the filtered composition was dried at the temperature of 70° C.; wherein, the weight percentage of the amorphous iron oxide hydroxide in the filtered composition was 100%; the sulfur capacity of the composition was 62%. The pH value of the solution was controlled by controlling the supply of hydroxide, i.e. controlling the weight proportion of two compositions, which was the same in the following embodiments.

The process of method 1 for regeneration the composition after being used for desulfurization is described below:

The composition was added to a desulfurization reactor. After $H_2S$ passing through the reactor, the resultant waste mixture was unloaded, washed with water and ground in the presence of water using a wet ball mill into powders with a particle size of 300 mesh. An aqueous suspension of the powders was prepared with a solid weight percent of 15%, compressed air was charged into the suspension, and a sample was collected for testing after reaction for a period. When no $H_2S$ was produced from the reaction between the sample and hydrochloric acid, the iron sulfide in the suspension was determined to have been completely transformed into a slurry comprising amorphous iron oxide hydroxide and elemental sulfur. The slurry was filtered to yield a solid that was extracted thrice with $CCl_4$. The extract was combined and distilled to yield crystalline elemental sulfur. The remaining solid after extraction was a composition comprising amorphous iron oxide hydroxide. The composition was roasted and could be reused as a desulfurizer. The composition had a sulfur capacity of 59%. After second, third, and fourth rounds of regeneration, the composition had a sulfur capacity of 58%, 56%, and 54%, respectively.

The process of method 2 for regeneration the composition after being used for desulfurization is described below:

The composition comprising amorphous iron oxide hydroxide was added to a desulfurization reactor. After $H_2S$ passing through the reactor, the resultant waste mixture was unloaded, washed with water and ground in the presence of water using a wet ball mill into powders of particle size 300 mesh. An aqueous suspension of the powders was prepared with a solid weight percent of 15%, compressed air was charged into the suspension, and a sample was collected for testing after reaction for a period. When no $H_2S$ was produced from the reaction between the sample and hydrochloric acid, the iron sulfide in the suspension was determined to have completely transformed into a slurry comprising amorphous iron oxide hydroxide and elemental sulfur. The slurry was placed in a flotation tank. Water was added, and water glass and kerosene were further added as an auxiliary agents, and air was charged into the slurry. Due to its hydrophobicity, elemental sulfur floated and was removed by overflowing the tank. The precipitate at the bottom of the tank was a composition comprising amorphous iron oxide hydroxide. The composition was roasted and could be reused as a desulfurizer. The composition had a sulfur capacity of 59%. After second, third, and fourth rounds of regeneration, the composition had a sulfur capacity of 58%, 56%, and 54%, respectively.

EXAMPLE 4

The process for preparing the composition containing amorphous iron oxide hydroxide comprises the following steps:

Firstly, the water solution prepared with KOH was put in a reactor; the water solution prepared with $FeCl_2$ was put into the reactor and the mixture was stirred simultaneously; then the reaction temperature was controlled between 40° C. and 50° C. by controlling the feeding rate of $FeCl_2$ water solution and the pH value of the solution at the end of reaction is kept at 8; after the reaction, the solution in the reactor was filtered, and the filter cake was washed with water until the content of $K^+$ was less than 0.5%; after that, the filter cake was prepared into water suspension containing 5% solid in weight percentage, and the air was charged into the solution for oxidation until the $Fe^{2+}/Fe_t$ was less than 1%, so that it was considered the composition was completed oxidized; then the suspension was filtered, and the composition containing amorphous iron oxide hydroxide was obtained after the filtered composition was dried at the temperature of 60° C.; wherein, the weight percentage of the amorphous iron oxide hydroxide in the filtered composition was 92%, and the other ingredients were KCl and water; the sulfur capacity of the composition was 57%.

The process of method 1 for regeneration the composition after being used for desulfurization is described below:

The composition was added to a desulfurization reactor. After $H_2S$ passing through the reactor, the resultant waste mixture was unloaded, the resultant waste mixture was unloaded, washed with water and ground in the presence of water using a wet ball mill into powders of particle size 400 mesh. An aqueous suspension of the powders was prepared with a solid weight percent of 30%, compressed air was charged into the slurry, and a sample was collected for testing after reaction for a period. When no $H_2S$ was produced from the reaction between the sample and hydrochloric acid, the iron sulfide in the suspension was determined to have been completely transformed into a slurry comprising amorphous iron oxide hydroxide and elemental sulfur. The slurry was filtered to yield a solid that was extracted thrice with $CS_2$. The extract was combined and distilled to yield crystalline elemental sulfur. The solid remaining after extraction was a composition comprising amorphous iron oxide hydroxide. The composition was roasted and could be reused as a desulfurizer. The composition had a sulfur capacity of 55%. After second, third, and fourth rounds of regeneration, the composition had a sulfur capacity of 53%, 50%, and 48%, respectively.

The process of method 2 for regeneration the composition after being used for desulfurization is described below:

The composition was added to a desulfurization reactor. After $H_2S$ passing through the reactor, the resultant waste mixture was unloaded, the resultant waste mixture was unloaded, washed with water and ground in the presence of water using a wet ball mill into powders of particle size 400 mesh. An aqueous suspension of the powders was prepared with a solid weight percent of 30%, compressed air was charged into the suspension, and a sample was collected for testing after reaction for a period. When no $H_2S$ was produced from the reaction between the sample and hydrochloric acid, the iron sulfide in the suspension was determined to have completely transformed into a slurry comprising amorphous iron oxide hydroxide and elemental sulfur. The slurry was placed in a flotation tank. Water was added, and water glass and kerosene were further added as an auxiliary agents, and air was charged into the slurry. Due to its hydrophobicity, elemental sulfur floated and was removed by overflowing the tank. The precipitate at the bottom of the tank was a composition comprising amorphous iron oxide hydroxide. The composition was roasted and could be reused as a desulfurizer. The composition had a sulfur capacity of 55%. After second, third, and fourth rounds of regeneration, the composition had a sulfur capacity of 54%, 52%, and 50%, respectively.

EXAMPLE 5

The process for preparing the composition containing amorphous iron oxide hydroxide comprises the following steps:

Firstly, the water solutions prepared with solid NaOH and solid $FeSO_4.7H_2O$ respectively were mixed in a reactor; then the reaction temperature was controlled between 60° C. and 70° C. by controlling the feeding rate of $FeSO_4$ solution and NaOH solution and the PH value of the solution at the end of reaction is kept at 8.5; after the reaction, the solution in the reactor was filtered, and the filter cake was washed with water until the content of $Na^+$ was less than 0.5%; after that, the filter cake was prepared into water suspension containing 5% solid in weight percentage, and the air was charged into the solution for oxidation until the $Fe^{2+}/Fe_t$ was less than 1%, so that it was considered the composition was completed oxidized; then the suspension was filtered, and the composition containing amorphous iron oxide hydroxide was obtained after the filtered composition was dried at the temperature of 60° C.; wherein, the weight percentage of the amorphous iron oxide hydroxide in the filtered composition was 88%, and the other ingredients were $Na_2SO_4$, water, $TiO_2$ and ferroferric oxide; the sulfur capacity of the composition was 55%.

The process of method 1 for regeneration the composition after being used for desulfurization is described below:

The composition was added to a desulfurization reactor. After $H_2S$ passing through the reactor, the resultant waste mixture was unloaded, the resultant waste mixture was unloaded, washed with water and ground in the presence of water using a wet ball mill into powders of particle size 400 mesh. An aqueous suspension of the powders was prepared with a solid weight percent of 10%, compressed air was charged into the slurry, and a sample was collected for testing after reaction for a period. When no $H_2S$ was produced from the reaction between the sample and hydrochloric acid, the iron sulfide in the suspension was determined to have been completely transformed into a slurry comprising amorphous iron oxide hydroxide and elemental sulfur. The slurry was filtered to yield a solid that was extracted thrice with $CS_2$. The extract was combined and distilled to yield crystalline elemental sulfur. The solid remaining after extraction was a composition comprising amorphous iron oxide hydroxide. The composition was roasted and could be reused as a desulfurizer. The composition had a sulfur capacity of 53%. After second, third, and fourth rounds of regeneration, the composition had a sulfur capacity of 51%, 48%, and 46%, respectively.

The process of method 2 for regeneration the composition after being used for desulfurization is described below:

The composition was added to a desulfurization reactor. After $H_2S$ passing through the reactor, the resultant waste mixture was unloaded, the resultant waste mixture was unloaded, washed with water and ground in the presence of water using a wet ball mill into powders of particle size 400 mesh. An aqueous suspension of the powders was prepared with a solid weight percent of 30%, compressed air was charged into the suspension, and a sample was collected for testing after reaction for a period. When no $H_2S$ was produced from the reaction between the sample and hydrochloric acid, the iron sulfide in the suspension was determined to have completely transformed into a slurry comprising amorphous iron oxide hydroxide and elemental sulfur. The solid was filtered from the slurry was placed in a flotation tank. Water was added, and water glass and kerosene were further added as an auxiliary agents, and air was charged into the slurry. Due to its hydrophobicity, elemental sulfur floated and was removed by overflowing the tank. The precipitate at the bottom of the tank was a composition comprising amorphous iron oxide hydroxide. The composition was roasted and could be reused as a desulfurizer. The composition had a sulfur capacity of 53%. After second, third, and fourth rounds of regeneration, the composition had a sulfur capacity of 51%, 49%, and 48%, respectively.

EXAMPLE 6

The process for preparing the composition containing amorphous iron oxide hydroxide comprises the following steps:

Firstly, the water solution prepared with 152 g $FeSO_4.7H_2O$ was put in a reactor; then 45 g solid NaOH was put into the reactor and the mixture was stirred simultaneously, the reaction temperature was controlled not exceeding 70° C. by controlling the feeding rate of the solid NaOH; after the reaction, the solution in the reactor was filtered, and the filter cake was washed with water until the content of $Na^+$ was less than 0.5%; after that, the filter cake was prepared into water suspension containing 30% solid in weight percentage, and the air was charged into the solution for oxidation until the $Fe^{2+}/Fe_t$ was less than 1%, so that it was considered the composition was completed oxidized; then the suspension was filtered, and the composition containing amorphous iron oxide hydroxide was obtained after the filtered composition was dried at the temperature of 90° C.; wherein, the weight percentage of the amorphous iron oxide hydroxide in the filtered composition was 85%, and the other ingredients were $Na_2SO_4$, water, and $TiO_2$; the sulfur capacity of the composition was 53%. $Fe_t$ was the total content of Ferrum element, and $Fe^{2+}/Fe_t$ was determined via phenanthroline spectrophotometry, the content of $Na^+$ was determined via flame photometry, which were the same in the following embodiments.

The process of method 1 for regeneration the composition after being used for desulfurization is described below:

The composition was added to a desulfurization reactor. After $H_2S$ passing through the reactor, the resultant waste mixture was unloaded, the resultant waste mixture was unloaded, washed with water and ground in the presence of water using a wet ball mill into powders of particle size 100 mesh. An aqueous suspension of the powders was prepared with a solid weight percent of 5%. Compressed air was charged into the suspension and a sample was collected for testing after reaction for a period. When no $H_2S$ was produced from the reaction between the sample and hydrochloric acid, the iron sulfide in the suspension was determined to have completely transformed into a slurry comprising amorphous iron oxide hydroxide and elemental sulfur. The slurry was filtered to yield a solid that was extracted thrice with $CCl_4$. The extract was combined and distilled to yield crystalline elemental sulfur. The solid remaining after extraction was a composition comprising amorphous iron oxide hydroxide. The composition was roasted and could be reused as a desulfurizer. The composition had a sulfur capacity of 50%. After second, third, and fourth rounds of regeneration, the composition had a sulfur capacity of 48%, 46%, and 44%, respectively.

The process of method 2 for regeneration the composition after being used for desulfurization is described below:

The composition was added to a desulfurization reactor. After $H_2S$ passing through the reactor, the resultant waste mixture was unloaded, washed with water and ground in the presence of water using a wet ball mill into powders of particle size 100 mesh. An aqueous suspension of the powders was prepared with a solid weight percent of 5%, compressed air was charged into the suspension, and a sample was collected for testing after reaction for a period. When no $H_2S$ was produced from the reaction between the sample and hydrochloric acid, the iron sulfide in the suspension was determined to have completely transformed into a slurry comprising amorphous iron oxide hydroxide and elemental sulfur. The slurry was filtered to yield a solid. The solid was placed in a flotation tank, water was added, and air was charged. Due to the hydrophobicity, elemental sulfur floated and was removed by overflowing the tank. The precipitate in the bottom of the tank was a composition comprising amorphous iron oxide hydroxide. The overflowed elemental sulfur could be purified by extraction or other methods. The composition was roasted and could be reused as a desulfurizer. The composition had a sulfur capacity of 52%. After second, third, and fourth rounds of regeneration, the composition had a sulfur capacity of 50%, 48%, and 46%, respectively.

EXAMPLE 7

The process for preparing the composition containing amorphous iron oxide hydroxide comprises the following steps:

Firstly, the water solution prepared with 127 g $FeCl_2.4H_2O$ was put into the reactor; 75 g solid KOH was added, and the mixture was stirred simultaneously; then the reaction temperature was controlled not exceeding 50° C. by controlling the feeding rate of the solid KOH; after the reaction, the solution in the reactor was filtered, and the filter cake was washed with water until the content of $K^+$ was less than 0.5%; after that, the filter cake was prepared into water suspension containing 15% solid in weight percentage, and the air was charged into the solution for oxidation until the $Fe^{2+}/Fe_t$ was less than 1%, so that it was considered the composition was completed oxidized; then the suspension was filtered, and the composition containing amorphous iron oxide hydroxide was obtained after the filtered composition was dried at the temperature of 100° C.; wherein, the weight percentage of the amorphous iron oxide hydroxide in the filtered composition was 80%, and the other ingredients were KCl, water and unknown impurity; the sulfur capacity of the composition was 50%.

The process of method 1 for regeneration the composition after being used for desulfurization is described below:

The composition was added to a desulfurization reactor. After $H_2S$ passing through the reactor, the resultant waste mixture was unloaded, the resultant waste mixture was unloaded, washed with water and ground in the presence of water using a wet ball mill into powders of particle size 200 mesh. An aqueous suspension of the powders was prepared with a solid weight percent of 10%, compressed air was charged, and a sample was collected for testing after reaction for a period. When no $H_2S$ was produced from the reaction between the sample and hydrochloric acid, the iron sulfide in the suspension was determined to be completely transformed into a slurry comprising amorphous iron oxide hydroxide and elemental sulfur. The slurry was filtered to yield a solid that was extracted thrice with $CS_2$. The extract was combined and distilled to yield crystalline elemental sulfur. The remaining solid after extraction was a composition comprising amorphous iron oxide hydroxide. The composition was roasted and could be reused as a desulfurizer. The composition had a sulfur capacity of 48%. After second, third, and fourth rounds of regeneration, the composition had a sulfur capacity of 46%, 44.5%, and 42%, respectively.

The process of method 2 for regeneration the composition after being used for desulfurization is described below:

The composition was added to a desulfurization reactor. After $H_2S$ passing through the reactor, the resultant waste mixture was unloaded, the resultant waste mixture was unloaded, washed with water and ground in the presence of water using a wet ball mill into powders of particle size 200 mesh. An aqueous suspension of the powders was prepared with a solid weight percent of 10%, compressed air was charged into the suspension, and a sample was collected for testing after reaction for a period. When no $H_2S$ was produced from the reaction between the sample and hydrochloric acid, the iron sulfide in the suspension was determined to have completely transformed into a slurry comprising amorphous iron oxide hydroxide and elemental sulfur. The slurry was placed in a flotation tank. Water was added, and water glass and kerosene were further added as an auxiliary agents, and air was charged into the slurry. Due to its hydrophobicity, elemental sulfur floated and was removed by overflowing the tank. The precipitate at the bottom of the tank was a composition comprising amorphous iron oxide hydroxide. The composition was roasted and could be reused as a desulfurizer. The composition had a sulfur capacity of 48%. After second, third, and fourth rounds of regeneration, the composition had a sulfur capacity of 46.5%, 45%, and 44%, respectively. The auxiliary agents accelerated the separation of the amorphous iron oxide hydroxide and the elemental sulfur, which were the same in the following embodiments.

EXAMPLE 8

The process for preparing the composition containing amorphous iron oxide hydroxide comprises the following steps:

Firstly, the water solution prepared with solid $Fe(NO_3)_2 \cdot 6H_2O$ was put in a reactor; solid NaOH was further put into the reactor and the mixture was stirred simultaneously; the reaction temperature was controlled between 30° C. and 40° C. by controlling the feeding rate of the solid NaOH; the pH value of the solution at the end of the reaction was kept at 7.5, and after the reaction, the solution in the reactor was filtered, and the filter cake was washed with water until the content of $Na^+$ was less than 0.5%; after that, the filter cake was prepared into water suspension containing 10% solid in weight percentage, and the air was charged into the solution for oxidation until the $Fe^{2+}/Fe_t$ was less than 1%, so that it was considered the composition was completed oxidized; then the suspension was filtered, and the composition containing amorphous iron oxide hydroxide was obtained after the filtered composition was dried at the temperature of 80° C.; wherein, the weight percentage of the amorphous iron oxide hydroxide in the filtered composition was 100%; the sulfur capacity of the composition was 62%.

In this embodiment, the pH value of the solution was controlled by controlling the supply of hydroxide, i.e. controlling the weight proportion of two compositions, which was the same in the following embodiments.

The process of method 1 for regeneration the composition after being used for desulfurization is described below:

The composition was added to a desulfurization reactor. After $H_2S$ passing through the reactor, the resultant waste mixture was unloaded, the resultant waste mixture was unloaded, washed with water and ground in the presence of water using a wet ball mill into powders with a particle size of 300 mesh. An aqueous suspension of the powders was prepared with a solid weight percent of 15%, compressed air was charged into the suspension, and a sample was collected for testing after reaction for a period. When no $H_2S$ was produced from the reaction between the sample and hydrochloric acid, the iron sulfide in the suspension was determined to have been completely transformed into a slurry comprising amorphous iron oxide hydroxide and elemental sulfur. The slurry was filtered to yield a solid that was extracted thrice with $CCl_4$. The extract was combined and distilled to yield crystalline elemental sulfur. The remaining solid after extraction was a composition comprising amorphous iron oxide hydroxide. The composition was roasted and could be reused as a desulfurizer. The composition had a sulfur capacity of 59%. After second, third, and fourth rounds of regeneration, the composition had a sulfur capacity of 58%, 56%, and 54%, respectively.

The process of method 2 for regeneration the composition after being used for desulfurization is described below:

The composition was added to a desulfurization reactor. After $H_2S$ passing through the reactor, the resultant waste mixture was unloaded, the resultant waste mixture was unloaded, washed with water and ground in the presence of water using a wet ball mill into powders of particle size 300 mesh. An aqueous suspension of the powders was prepared with a solid weight percent of 15%, compressed air was charged into the suspension, and a sample was collected for testing after reaction for a period. When no $H_2S$ was produced from the reaction between the sample and hydrochloric acid, the iron sulfide in the suspension was determined to have completely transformed into a slurry comprising amorphous iron oxide hydroxide and elemental sulfur. The slurry was placed in a flotation tank. Water was added, and water glass and kerosene were further added as an auxiliary agents, and air was charged into the slurry. Due to its hydrophobicity, elemental sulfur floated and was removed by overflowing the tank. The precipitate at the bottom of the tank was a composition comprising amorphous iron oxide hydroxide. The composition was roasted and could be reused as a desulfurizer. The composition had a sulfur capacity of 59%. After second, third, and fourth rounds of regeneration, the composition had a sulfur capacity of 58%, 56%, and 54%, respectively.

EXAMPLE 9

The process for preparing the composition containing amorphous iron oxide hydroxide comprises the following steps:

Firstly, the water solution prepared with solid $FeCl_2$ was put in a reactor; solid $Ca(OH)_2$ was further put into the reactor and the mixture was stirred simultaneously; then the reaction temperature was controlled between 40° C. and 50° C. by controlling the feeding rate of solid $Ca(OH)_2$ and the pH value of the solution at the end of reaction is kept at 8; after the reaction, the solution in the reactor was filtered, and the filter cake was washed with water until the content of $Cl^-$ in the filter cake was less than 0.5%; after that, the filter cake was prepared into water suspension containing 5% solid in weight percentage, and the air was charged into the solution for oxidation until the $Fe^{2+}/Fe_t$ was less than 1%, so that it was considered the composition was completed oxidized; then the suspension was filtered, and the composition containing amorphous iron oxide hydroxide was obtained after the filtered composition was dried at the temperature of 70° C.; wherein, the weight percentage of the amorphous iron oxide hydroxide in the filtered composition was 92%, and the other ingredients were $CaCl_2$ and water; the sulfur capacity of the composition was 57%. wherein, the content of $Cl^-$ was determined with mercuric thiocyanate colorimetry.

The process of method 1 for regeneration the composition after being used for desulfurization is described below:

The composition was added to a desulfurization reactor. After $H_2S$ passing through the reactor, the resultant waste mixture was unloaded, washed with water and ground in the presence of water using a wet ball mill into powders of particle size 400 mesh. An aqueous suspension of the powders was prepared with a solid weight percent of 30%, compressed air was charged into the slurry, and a sample was collected for testing after reaction for a period. When no $H_2S$ was produced from the reaction between the sample and hydrochloric acid, the iron sulfide in the suspension was determined to have been completely transformed into a slurry comprising amorphous iron oxide hydroxide and elemental sulfur. The slurry was filtered to yield a solid that was extracted thrice with $CS_2$. The extract was combined and distilled to yield crystalline elemental sulfur. The solid remaining after extraction was a composition comprising amorphous iron oxide hydroxide. The composition was roasted and could be reused as a desulfurizer. The composition had a sulfur capacity of 55%. After second, third, and fourth rounds of regeneration, the composition had a sulfur capacity of 53%, 50%, and 48%, respectively.

The process of method 2 for regeneration the composition after being used for desulfurization is described below:

The composition was added to a desulfurization reactor. After $H_2S$ passing through the reactor, the resultant waste mixture was unloaded, washed with water and ground in the presence of water using a wet ball mill into powders of particle size 400 mesh. An aqueous suspension of the powders was prepared with a solid weight percent of 30%, compressed air was charged into the suspension, and a sample was collected for testing after reaction for a period. When no $H_2S$ was produced from the reaction between the sample and hydrochloric acid, the iron sulfide in the suspension was determined to have completely transformed into a slurry comprising amorphous iron oxide hydroxide and elemental sulfur. The slurry was placed in a flotation tank. Water was added, and water glass and kerosene were further added as an auxiliary agents, and air was charged into the slurry. Due to its hydrophobicity, elemental sulfur floated and was removed by overflowing the tank. The precipitate at the bottom of the tank was a composition comprising amorphous iron oxide hydroxide. The composition was roasted and could be reused as a desulfurizer. The composition had a sulfur capacity of 55%. After second, third, and fourth rounds of regeneration, the composition had a sulfur capacity of 54%, 52%, and 50%, respectively.

EXAMPLE 10

The process for preparing the composition containing amorphous iron oxide hydroxide comprises the following steps:

Firstly, the water solution prepared with solid $FeSO_4.7H_2O$ was put in a reactor, solid NaOH was further put into the reactor, and the mixture was stirred simultaneously; then the reaction temperature was controlled between 60° C. and 70° C. by controlling the feeding rate of solid NaOH and the pH value of the solution at the end of reaction is kept at 8.5; after the reaction, the solution in the reactor was filtered, and the filter cake was washed with water until the content of $Na^+$ was less than 0.5%; after that, the filter cake was prepared into water suspension containing 5% solid in weight percentage, and the air was charged into the solution for oxidation until the $Fe^{2+}/Fe_t$ was less than 1%, so that it was considered the composition was completed oxidized; then the suspension was filtered, and the composition containing amorphous iron oxide hydroxide was obtained after the filtered composition was dried at the temperature of 60° C.; wherein, the weight percentage of the amorphous iron oxide hydroxide in the filtered composition was 88%, and the other ingredients were $Na_2SO_4$, water, $TiO_2$, and ferroferric oxide; the sulfur capacity of the composition was 55%.

The process of method 1 for regeneration the composition after being used for desulfurization is described below:

The composition was added to a desulfurization reactor. After $H_2S$ passing through the reactor, the resultant waste mixture was unloaded, washed with water and ground in the presence of water using a wet ball mill into powders of particle size 400 mesh. An aqueous suspension of the powders was prepared with a solid weight percent of 10%, compressed air was charged into the slurry, and a sample was collected for testing after reaction for a period. When no $H_2S$ was produced from the reaction between the sample and hydrochloric acid, the iron sulfide in the suspension was determined to have been completely transformed into a slurry comprising amorphous iron oxide hydroxide and elemental sulfur. The slurry was filtered to yield a solid that was extracted thrice with $CS_2$. The extract was combined and distilled to yield crystalline elemental sulfur. The solid remaining after extraction was a composition comprising amorphous iron oxide hydroxide. The composition was roasted and could be reused as a desulfurizer. The composition had a sulfur capacity of 53%. After second, third, and fourth rounds of regeneration, the composition had a sulfur capacity of 51%, 48%, and 46%, respectively.

The process of method 2 for regeneration the composition after being used for desulfurization is described below:

The composition was added to a desulfurization reactor. After passing $H_2S$ through the reactor, the resultant waste mixture was unloaded, washed with water and ground in the presence of water using a wet ball mill into powders of particle size 400 mesh. An aqueous suspension of the powders was prepared with a solid weight percent of 30%, compressed air was charged into the suspension, and a sample was collected for testing after reaction for a period. When no $H_2S$ was produced from the reaction between the sample and hydrochloric acid, the iron sulfide in the suspension was determined to have completely transformed into a slurry comprising amorphous iron oxide hydroxide and elemental sulfur. The solid filtered from the slurry was placed in a flotation tank. Water was added, and water glass and kerosene were further added as an auxiliary agents, and air was charged into the slurry. Due to its hydrophobicity, elemental sulfur floated and was removed by overflowing the tank. The precipitate at the bottom of the tank was a composition comprising amorphous iron oxide hydroxide. The composition was roasted and could be reused as a desulfurizer. The composition had a sulfur capacity of 53%. After second, third, and fourth rounds of regeneration, the composition had a sulfur capacity of 51%, 49%, and 48%, respectively.

EXAMPLE 11

The process for preparing the composition containing amorphous iron oxide hydroxide comprises the following steps:

Firstly, the water solution prepared with 3040 g $FeSO_4.7H_2O$ was put in a reactor; then the water solution prepared with 900 g NaOH was further put into the reactor and the mixture was stirred simultaneously, the reaction temperature was controlled not exceeding 90° C. by controlling the feeding rate of the NaOH solution; after the reaction, the solution in the reactor was filtered, and the filter cake was washed with water until the content of $Na^+$ was less than 0.5%; after that, the filter cake was prepared into water suspension containing 30% solid in weight percentage, and the air was charged into the solution for oxidation until the $Fe^{2+}/Fe_t$ was less than 1%, so that it was considered the composition was completed oxidized; then the suspension was filtered, and the composition containing amorphous iron oxide hydroxide was obtained after the filtered composition was dried at the temperature of 90° C.; wherein, the weight percentage of the amorphous iron oxide hydroxide in the filtered composition was 85%, and the other ingredients were $Na_2SO_4$, water and $TiO_2$ ($TiO_2$ is the impurity in industrial $FeSO_4.7H_2O$); the sulfur capacity of the composition was 45%. $Fe_t$ was the total content of Fe, and $Fe^{2+}/Fe_t$ was determined via phenanthroline spectrophotometry, the content of $Na^+$ was determined via flame photometry. The content of amorphous iron oxide hydroxide in the composition containing amorphous iron oxide hydroxide was determined through the titanium trichloride-potassium dichromate volumetric method, and this method is one of the National Standards (GB6730.5-86) for analyzing the Iron ore, which is the same in the following embodiments.

The processes for preparing and regeneration of desulfurizer are described below:

500 g composition comprising amorphous iron oxide hydroxide with a particle size of 100 mesh, 40 g sesbania powder, and 10 g sawdust were mixed uniformly, kneaded with appropriate quantities of water using a small kneader, and extruded using a small twin screw extruder to yield a strip desulfurizer. The desulfurizer was roasted in an oven at 70° C. for 6 h and the sulfur capacity thereof was measured to be 43%. The desulfurizer was named desulfurizer (A).

The desulfurizer (A) was added to a desulfurization reactor. After $H_2S$ passing through the reactor, the resultant waste mixture was unloaded, washed with water and ground in the presence of water using a wet ball mill into powders of particle size 100 mesh. An aqueous suspension of the powders was prepared with a solid weight percent of 10%. Compressed air was charged into the slurry and a sample was collected for testing after reaction for a period. When no $H_2S$ was produced from the reaction between the sample and hydrochloric acid, the iron sulfide in the suspension was determined to have been completely transformed into a slurry comprising amorphous iron oxide hydroxide and elemental sulfur. The slurry was placed in a flotation tank, water was added, and air was charged. The elemental sulfur, additive, and binder were removed, together with excess air, by overflowing the tank. The precipitate in the bottom of the tank was a composition comprising amorphous iron oxide hydroxide. The overflowed elemental sulfur could be purified by extraction or other methods. The composition comprising amorphous iron oxide hydroxide was roasted at 80° C., and sesbania powder and sawdust were added according to the proportions described above. The mixture was treated in accordance with the method and reaction conditions described above to yield a new desulfurizer (desulfurizer B) with a sulfur capacity of 41.5%.

The desulfurizer (B) was used to desulfurize in a reactor and was unloaded after the $H_2S$ was passed. Then the desulfurizer B was regenerated according to the process described, and the regenerant of the desulfurizer B was obtained. After that, sesbania powder and sawdust were added according to the proportions described above. The mixture was treated in accordance with the method and reaction conditions described above to yield a new desulfurizer (desulfurizer C) with a sulfur capacity of 40%.

After four rounds of desulfurizing and regenerating, the fifth desulfurizer generated (desulfurizer E) had a sulfur capacity of 36.5%.

EXAMPLE 12

The process for preparing the composition containing amorphous iron oxide hydroxide comprises the following steps:

Firstly, the water solution prepared with 750 g KOH was put in a reactor, and the water solution prepared with 1270 g $FeCl_2.4H_2O$ was further put into the reactor and the mixture was stirred simultaneously; then the reaction temperature was controlled not exceeding 50° C. by controlling the feeding rate of $FeCl_2$ water solution; after the reaction, the solution in the reactor was filtered, and the filter cake was washed with water until the content of $K^+$ was less than 0.5%; after that, the filter cake was prepared into water suspension containing 15% solid in weight percentage, and the air was charged into the solution for oxidation until the $Fe^{2+}/Fe_t$ was less than 1%, so that it was considered the composition was completed oxidized; then the suspension was filtered, and the composition containing amorphous iron oxide hydroxide was obtained after the filtered composition was dried at the temperature of 100° C.; wherein, the weight percentage of the amorphous iron oxide hydroxide in the filtered composition was 80%, and the other ingredients were KCl, water and unknown impurity; the sulfur capacity of the composition was 50%. Wherein, the content of $K^+$ was determined through flame photometry, which was the same in the following embodiments.

The processes for preparation and regeneration of the desulfurizer are described as below:

400 g composition comprising amorphous iron oxide hydroxide with a particle size of 100 mesh, 48 g sesbania powder, and 5 g rice hull powder were mixed uniformly, kneaded with appropriate quantities of water using a small kneader, and extruded using a small twin screw extruder to yield a strip desulfurizer, and shaped into ball-shaped desulfurzier using a pill machine. The desulfurizer was roasted in an oven at 60° C. for 7 h and the sulfur capacity thereof was measured to be 48.5%. The desulfurizer was named desulfurizer A.

The desulfurizer A was added to a desulfurization reactor. After $H_2S$ passing through the reactor, the resultant waste mixture was unloaded, washed with water and ground in the presence of water using a wet ball mill into powders of particle size 200 mesh. An aqueous suspension of the powders was prepared with a solid weight percent of 15%, compressed air was charged, and a sample was collected for testing after reaction for a period. When no $H_2S$ was produced from the reaction between the sample and hydrochloric acid, the iron sulfide in the suspension was determined to be completely transformed into a slurry comprising amorphous iron oxide hydroxide and elemental sulfur. The slurry was filtered to yield a solid that was extracted thrice with $CS_2$. The extract was combined and distilled to yield crystalline elemental sulfur. The remaining solid after extraction was a composition comprising amorphous iron oxide hydroxide. The composition comprising amorphous iron oxide hydroxide was roasted at 70° C., and sesbania powder and rice hull powder were added according to the proportions described above. The mixture was treated according to the method and reaction conditions described above to yield a new desulfurizer (desulfurizer B) with a sulfur capacity of 46%.

The desulfurizer B was used to desulfurize in a reactor and was unloaded after the $H_2S$ was passed. Then the desulfurizer B was regenerated according to the process described, and the regenerant of the desulfurizer B was obtained. After that, sesbania powder and rice hull powder were added according to the proportions described above. The mixture was treated in accordance with the method and reaction conditions described above to yield a new desulfurizer (desulfurizer c) with a sulfur capacity of 43.5%.

EXAMPLE 13

The process for preparing the composition containing amorphous iron oxide hydroxide comprises the following steps:

Firstly, the water solution prepared with solid $Fe(NO_3)_2 \cdot 6H_2O$ was put in a reactor, the water solution prepared with solid NaOH was further put into the reactor and the mixture was stirred simultaneously; the reaction temperature was controlled between 30° C. and 40° C. by controlling the feeding rate of the NaOH solution; the pH value of the solution at the end of the reaction was kept at 7.5, and after the reaction, the solution in the reactor was filtered, and the filter cake was washed with water until the content of $Na^+$ was less than 0.5%; after that, the filter cake was prepared into water suspension containing 10% solid in weight percentage, and the air was charged into the solution for oxidation until the $Fe^{2+}/Fe_t$ was less than 1%, so that it was considered the composition was completed oxidized; then the suspension was filtered, and the composition containing amorphous iron oxide hydroxide was obtained after the filtered composition was dried at the temperature of 85° C.; wherein, the weight percentage of the amorphous iron oxide hydroxide in the filtered composition was 99%, the other ingredient was water, and the sulfur capacity of the composition was 59%. In this embodiment, the pH value of the solution was controlled by controlling the supply of hydroxide, i.e. controlling the weight proportion of two compositions, which was the same in the following embodiments.

The processes for preparation and regeneration of the desulfurizer are described as below:

1000 g composition comprising amorphous iron oxide hydroxide with particle size 100 mesh and 80 g sesbania powder were mixed uniformly in a mixer and extruded using a water chestnut shape sugar-coating machine to yield a ball desulfurizer (Φ3-5). The desulfurizer was roasted in an oven at 90° C. for 4 h, and the sulfur capacity thereof was measured to be 56%. The desulfurizer was named desulfurizer A.

The desulfurizer A was added to a desulfurization reactor. After $H_2S$ passing through the reactor, the resultant waste mixture was unloaded, washed with water and ground in the presence of water using a wet ball mill into powders with particle size 400 mesh. An aqueous suspension of the powders was prepared with a solid weight percent of 5%, compressed air was charged, and a sample was collected for testing after reaction for a period. When no $H_2S$ was produced from the reaction between the sample and hydrochloric acid, the iron sulfide in the suspension was determined to have been completely transformed into a slurry comprising amorphous iron oxide hydroxide and elemental sulfur. The slurry was placed in a flotation tank. Water, as an auxiliary agent, and water glass and kerosene were added, and air was charged into the slurry, and the elemental sulfur, additive, and binder were removed, together with excess air, from the tank by overflowing. The precipitate at the bottom of the tank was a composition comprising amorphous iron oxide hydroxide. The overflowed elemental sulfur could be purified by some forms of extraction. The composition comprising amorphous iron oxide hydroxide was roasted at 80° C., and sesbania powder was added according to the proportions listed above. The mixture was treated following the method and reaction conditions described above to yield a new desulfurizer (Desulfurizer B) with a sulfur capacity of 54%.

The desulfurizer B was used to desulfurize in a reactor and was unloaded after the $H_2S$ was passed. Then the desulfurizer B was regenerated according to the process described, and the regenerant of the desulfurizer B was obtained. After that, sesbania powder was added according to the proportions described above. The mixture was treated in accordance with the method and reaction conditions described above to yield a new desulfurizer (desulfurizer C) with a sulfur capacity of 52.5%.

After four applications of the process, a fifth desulfurizer (desulfurizer E) with a sulfur capacity of 47% was obtained. The auxiliary agent accelerated the separation of amorphous iron oxide hydroxide and elemental sulfur, which was the same in the following embodiments.

EXAMPLE 14

The process for preparing the composition containing amorphous iron oxide hydroxide comprises the following steps:

Firstly, the water solution prepared with KOH was put in a reactor; the water solution prepared with solid $FeCl_2$ was further put into the reactor and the mixture was stirred simultaneously; then the reaction temperature was controlled between 40° C. and 50° C. by controlling the feeding rate of $FeCl_2$ water solution and the pH value of the solution at the end of reaction is kept at 8; after the reaction, the solution in the reactor was filtered, and the filter cake was washed with water until the content of $K^+$ was less than 0.5%; after that, the filter cake was prepared into water suspension containing 5% solid in weight percentage, and the air was charged into the solution for oxidation until the $Fe^{2+}/Fe_t$ was less than 1%, so that it was considered the composition was completed oxidized; then the suspension was filtered, and the composition containing amorphous iron oxide hydroxide was obtained after the filtered composition was dried at the temperature of 60° C.; wherein, the weight percentage of the amorphous iron oxide hydroxide in the filtered composition was 92%, and the other ingredients were KCl and water; the sulfur capacity of the composition was 57%.

The processes for preparation and regeneration of the desulfurizer are described as below:

500 g composition comprising amorphous iron oxide hydroxide with a particle size of 100 mesh, 45 g sodium carboxymethylcellulose (dissolved in advance), and 10 g wheat bran powder were mixed uniformly, kneaded with appropriate quantities of water using a small kneader, and extruded using a small twin screw extruder to yield a strip that was subsequently treated with a pill machine to yield a pill desulfurizer. The desulfurizer was roasted in an oven at 75° C. for 5 h and the sulfur capacity thereof was measured to be 54%. The desulfurizer was named desulfurizer A.

The desulfurizer A was added to a desulfurization reactor. After $H_2S$ passing through the reactor, the resultant waste mixture was unloaded, washed with water and ground in the presence of water using a wet ball mill into powders with particle size 200 mesh. An aqueous suspension of the powders was prepared with a solid weight percent of 30%, compressed air was charged into the slurry, and a sample was collected for testing after reaction for a period. When no $H_2S$ was produced from the reaction between the sample and hydrochloric acid, the iron sulfide in the suspension was determined to have been completely transformed into a slurry comprising amorphous iron oxide hydroxide and elemental sulfur. The slurry was filtered to yield a solid. The solid was placed into a flotation tank. After water, as an auxiliary agent, and water glass and kerosene were added and air was charged into the slurry, the elemental sulfur, additive, and binder were removed, together with excess air, by overflowing the tank. The precipitate at the bottom of the tank was a composition comprising amorphous iron oxide hydroxide. The overflowed elemental sulfur could be purified by extraction or other methods. The composition comprising amorphous iron oxide hydroxide was roasted at 75° C., and sodium carboxymethylcellulose (dissolved in advance) as well as wheat bran powders was added according to the proportions described above. The mixture was treated according to the method and reaction conditions described above to yield a new desulfurizer (desulfurizer B) with a sulfur capacity of 50%.

The desulfurizer B was used to desulfurize in a reactor and was unloaded after the $H_2S$ was passed. Then the desulfurizer B was regenerated according to the process described, and the regenerant of the desulfurizer B was obtained. After that, sodium carboxymethylcellulose and wheat bran powder were added according to the proportions described above. The mixture was treated in accordance with the method and reaction conditions described above to yield a new desulfurizer (desulfurizer C) with a sulfur capacity of 46.5%.

After four rounds of desulfurizing and regeneration, a fifth desulfurizer (desulfurizer E) with a sulfur capacity of 42% was obtained.

EXAMPLE 15

The process for preparing the composition containing amorphous iron oxide hydroxide comprises the following steps:

Firstly, the water solutions prepared with solid NaOH and solid $FeSO_4.7H_2O$ respectively were mixed in a reactor; then the reaction temperature was controlled between 60° C. and 70° C. by controlling the feeding rate of $FeSO_4$ solution and NaOH solution, and the PH value of the solution at the end of reaction is kept at 8.5; after the reaction, the solution in the reactor was filtered, and the filter cake was put in the air for oxidation until the $Fe^{2+}/Fe_t$ was less than 10%, so that it was considered the composition was completed oxidized; the composition obtained was washed with water until the content of $Na^+$ was less than 1%; after that, the composition was filtered; and the composition containing amorphous iron oxide hydroxide was obtained after the filtered composition was dried at the temperature of 80° C.; wherein, the weight percentage of the amorphous iron oxide hydroxide in the filtered composition was 85%, and the other ingredients were $Na_2SO_4$, water, $TiO_2$, and ferroferric oxide; the sulfur capacity of the composition was 52%.

The processes for preparation and regeneration of the desulfurizer are described as below:

500 g composition comprising amorphous iron oxide hydroxide and with a particle size of 100 mesh and 50 g cellulose powder were mixed uniformly, kneaded with appropriate quantities of water using a small kneader, and extruded using a small twin screw extruder to yield a strip that was subsequently treated using a pill machine to yield a pill desulfurizer. The desulfurizer was roasted in an oven at 80° C. for 4 h and the sulfur capacity thereof was measured to be 50%. The desulfurizer was named desulfurizer A.

The desulfurizer A was added to a desulfurization reactor. After $H_2S$ passing through the reactor, the resultant waste mixture was unloaded, washed with water and ground in the presence of water using a wet ball mill into powders with a particle size of 200 mesh. An aqueous suspension of the powders was prepared with a solid weight percent of 15%, compressed air was charged into the suspension, and a sample was collected for testing after reaction for a period. When no $H_2S$ was produced from the reaction between the sample and hydrochloric acid, the iron sulfide in the suspension was determined to have been completely transformed into a slurry comprising amorphous iron oxide hydroxide and elemental sulfur. The slurry was filtered to yield a solid that was extracted thrice with $CCl_4$. The extract was combined and distilled to yield crystalline elemental sulfur. The remaining solid after extraction was a composition comprising amorphous iron oxide hydroxide. The composition comprising amorphous iron oxide hydroxide was roasted at 70° C., and cellulose powders were added according to the proportions described above. The mixture was treated following the method and reaction conditions described above to yield a new desulfurizer (desulfurizer B) with a sulfur capacity of 46%.

The desulfurizer B was used to desulfurize in a reactor and was unloaded after the $H_2S$ was passed. Then the desulfurizer B was regenerated according to the process described, and the regenerant of the desulfurizer B was obtained. After that, cellulose powder was added according to the proportions described above. The mixture was treated in accordance with the method and reaction conditions described above to yield a new desulfurizer (desulfurizer c) with a sulfur capacity of 43.5%.

EXAMPLE 16

400 g regenerated desulfurizer E from Example 1 and 100 g prepared composition A comprising amorphous iron oxide hydroxide from example 1 with a particle size of 100 mesh, 35 g sesbania powder, and 20 g sawdust powder were mixed uniformly, kneaded with appropriate quantities of water using a small kneader, and extruded using a small twin screw extruder to yield a strip desulfurizer. The desulfurizer was dried naturally for 10 h and the sulfur capacity thereof was measured to be 43%.

EXAMPLE 17

The process for preparing the composition containing amorphous iron oxide hydroxide comprises the following steps:

Firstly, the water solution prepared with 3040 g $FeSO_4.7H_2O$ was put in a reactor; then 900 g NaOH was further put into the reactor and the mixture was stirred simultaneously, the reaction temperature was controlled not exceeding 90° C. by controlling the feeding rate of the solid NaOH; after the reaction, the solution in the reactor was filtered, and the filter cake was washed with water until the content of $Na^+$ was less than 0.5%; after that, the filter cake was prepared into water suspension containing 30% solid in weight percentage, and the air was charged into the solution for oxidation until the $Fe^{2+}/Fe_t$ was less than 1%, so that it was considered the composition was completed oxidized; then the suspension was filtered, and the composition containing amorphous iron oxide hydroxide was obtained after the filtered composition was dried at the temperature between 90° C. and 100° C.; wherein, the weight percentage of the amorphous iron oxide hydroxide in the filtered composition was 75%, and the other ingredients were $Na_2SO_4$, water, and $TiO_2$ ($TiO_2$ is the impurity in industrial $FeSO_4.7H_2O$, which was the same in the following embodiments); the sulfur capacity of the composition was 45%.

The processes for preparation and regeneration of the desulfurizer are described below:

500 g composition comprising amorphous iron oxide hydroxide with a particle size of 100 mesh, 40 g sesbania powder, and 10 g sawdust were mixed uniformly, kneaded with appropriate quantities of water using a small kneader, and extruded using a small twin screw extruder to yield a strip desulfurizer. The desulfurizer was roasted in an oven at 70° C. for 6 h and the sulfur capacity thereof was measured to be 43%. The desulfurizer was named desulfurizer A.

The desulfurizer A was added to a desulfurization reactor. After $H_2S$ passing through the reactor, the resultant waste mixture was unloaded, washed with water and ground in the presence of water using a wet ball mill into powders of particle size 100 mesh. An aqueous suspension of the powders was prepared with a solid weight percent of 10%. Compressed air was charged into the slurry and a sample was collected for testing after reaction for a period. When no $H_2S$ was produced from the reaction between the sample and hydrochloric acid, the iron sulfide in the suspension was determined to have been completely transformed into a slurry comprising amorphous iron oxide hydroxide and elemental sulfur. The slurry was placed in a flotation tank, water was added, and air was charged. The elemental sulfur, additive, and binder were removed, together with excess air, by overflowing the tank. The precipitate in the bottom of the tank was a composition comprising amorphous iron oxide hydroxide. The overflowed elemental sulfur could be purified by extraction or other methods. The composition comprising amorphous iron oxide hydroxide was roasted at 80° C., and sesbania powder and sawdust were added according to the proportions described above. The mixture was treated in accordance with the method and reaction conditions described above to yield a new desulfurizer (desulfurizer B) with a sulfur capacity of 41.5%.

The desulfurizer B was used to desulfurize in a reactor and was unloaded after the $H_2S$ was passed. Then the desulfurizer B was regenerated according to the process described, and the regenerant of the desulfurizer B was obtained. After that, sesbania powder and sawdust were added according to the proportions described above. The mixture was treated in accordance with the method and reaction conditions described above to yield a new desulfurizer (desulfurizer c) with a sulfur capacity of 40%.

After four rounds of desulfurizing and regenerating, the fifth desulfurizer generated (desulfurizer E) had a sulfur capacity of 36.5%.

EXAMPLE 18

The process for preparing the composition containing amorphous iron oxide hydroxide comprises the following steps:

Firstly, the water solution prepared with 1270 g $FeCl_2.4H_2O$ was put in a reactor; 750 g solid KOH was further put into the reactor and the mixture was stirred simultaneously; then the reaction temperature was controlled not exceeding 50° C. by controlling the feeding rate of solid KOH; after the reaction, the solution in the reactor was filtered, and the filter cake was washed with water until the content of $K^+$ was less than 0.5%; after that, the filter cake was prepared into water suspension containing 15% solid in weight percentage, and the air was charged into the solution for oxidation until the $Fe^{2+}/Fe_t$ was less than 1%, so that it was considered the composition was completed oxidized; then the suspension was filtered, and the composition containing amorphous iron oxide hydroxide was obtained after the filtered composition was dried at the temperature of 100° C.; wherein, the weight percentage of the amorphous iron oxide hydroxide in the filtered composition was 80%, and the other ingredients were KCl, water, and unknown impurity; the sulfur capacity of the composition was 50%.

The processes for preparation and regeneration of the desulfurizer are described below:

400 g composition comprising amorphous iron oxide hydroxide with particle size 100 mesh, 48 g sesbania powder, and 5 g rice hull powder were mixed uniformly, kneaded with appropriate quantities of water using a small kneader, and extruded using a small twin screw extruder to yield a strip. The strip was subsequently treated using a pill machine to yield a pill desulfurizer. The desulfurizer was roasted in an oven at 60° C. for 7 hours, and the sulfur capacity thereof was measured to be 48.5%. The desulfurizer was named desulfurizer A.

The desulfurizer A was added to a desulfurization reactor. After $H_2S$ passing through the reactor, the resultant waste mixture was unloaded, washed with water and ground in the presence of water using a wet ball mill into powders of particle size 200 mesh. An aqueous suspension of the powders was prepared with a solid weight percent of 15%, compressed air was charged, and a sample was collected for testing after reaction for a period. When no $H_2S$ was produced from the reaction between the sample and hydrochloric acid, the iron sulfide in the suspension was determined to be completely transformed into a slurry comprising amorphous iron oxide hydroxide and elemental sulfur. The slurry was filtered to yield a solid that was extracted thrice with $CS_2$. The extract was combined and distilled to yield crystalline elemental sulfur. The remaining solid after extraction was a composition comprising amorphous iron oxide hydroxide. The composition comprising amorphous iron oxide hydroxide was roasted at 70° C., and sesbania powder and rice hull powder were added according to the proportions described above.

The mixture was treated according to the method and reaction conditions described above to yield a new desulfurizer (desulfurizer B) with a sulfur capacity of 46%.

The desulfurizer B was used to desulfurize in a reactor and was unloaded after the $H_2S$ was passed. Then the desulfurizer B was regenerated according to the process described, and the regenerant of the desulfurizer B was obtained. After that, sesbania powder and rice hull powder were added according to the proportions described above. The mixture was treated in accordance with the method and reaction conditions described above to yield a new desulfurizer (desulfurizer c) with a sulfur capacity of 43.5%.

EXAMPLE 19

The process for preparing the composition containing amorphous iron oxide hydroxide comprises the following steps:

Firstly, the water solution prepared with solid $Fe(NO_3)_2 \cdot 6H_2O$ was put in a reactor; solid NaOH was further put into the reactor and the mixture was stirred simultaneously; the reaction temperature was controlled between 30° C. and 40° C. by controlling the feeding rate of solid NaOH; the pH value of the solution at the end of the reaction was kept at 7.5, and after the reaction, the solution in the reactor was filtered, and the filter cake was washed with water until the content of $Na^+$ was less than 0.5%; after that, the filter cake was prepared into water suspension containing 10% solid in weight percentage, and the air was charged into the solution for oxidation until the $Fe^{2+}/Fe_t$ was less than 1%, so that it was considered the composition was completed oxidized; then the suspension was filtered, and the composition containing amorphous iron oxide hydroxide was obtained after the filtered composition was dried at the temperature of 85° C.; wherein, the weight percentage of the amorphous iron oxide hydroxide in the filtered composition was 99%, the other ingredient was water, and the sulfur capacity of the composition was 59%. In this embodiment, the content of solid hydroxide was controlled by controlling the pH value of the solution, i.e. controlling the proportion of the two materials supplied.

The processes for preparation and regeneration of the desulfurizer are described below:

1000 g composition comprising amorphous iron oxide hydroxide with particle size 100 mesh and 80 g sesbania powder were mixed uniformly in a mixer and extruded using a water chestnut shape sugar-coating machine to yield a ball desulfurizer (Φ3-5). The desulfurizer was roasted in an oven at 90° C. for 4 h, and the sulfur capacity thereof was measured to be 56%. The desulfurizer was named desulfurizer A.

The desulfurizer A was added to a desulfurization reactor. After $H_2S$ passing through the reactor, the resultant waste mixture was unloaded, washed with water and ground in the presence of water using a wet ball mill into powders with particle size 400 mesh. An aqueous suspension of the powders was prepared with a solid weight percent of 5%, compressed air was charged, and a sample was collected for testing after reaction for a period. When no $H_2S$ was produced from the reaction between the sample and hydrochloric acid, the iron sulfide in the suspension was determined to have been completely transformed into a slurry comprising amorphous iron oxide hydroxide and elemental sulfur. The slurry was placed in a flotation tank. Water, as an auxiliary agent, and water glass and kerosene were added, and air was charged into the slurry, and the elemental sulfur, additive, and binder were removed, together with excess air, from the tank by overflowing. The precipitate at the bottom of the tank was a composition comprising amorphous iron oxide hydroxide.

The overflowed elemental sulfur could be purified by extraction or other methods. The composition comprising amorphous iron oxide hydroxide was roasted at 80° C., and sesbania powder was added according to the proportions listed above. The mixture was treated following the method and reaction conditions described above to yield a new desulfurizer (Desulfurizer B) with a sulfur capacity of 54%.

The desulfurizer B was used to desulfurize in a reactor and was unloaded after the $H_2S$ was passed. Then the desulfurizer B was regenerated according to the process described, and the regenerant of the desulfurizer B was obtained. After that, sesbania powder was added according to the proportions described above. The mixture was treated in accordance with the method and reaction conditions described above to yield a new desulfurizer (desulfurizer c) with a sulfur capacity of 52.5%.

After four applications of the process, a fifth desulfurizer (desulfurizer E) with a sulfur capacity of 47% was obtained. The auxiliary agent accelerated the separation of amorphous iron oxide hydroxide and elemental sulfur, which was the same in the following embodiments.

EXAMPLE 20

The process for preparing the composition containing amorphous iron oxide hydroxide comprises the following steps:

Firstly, the water solution prepared with solid $FeCl_2 \cdot 4H_2O$ was put in a reactor; solid $Ca(OH)_2$ was added to the water solution and the mixture was stirred simultaneously; then the reaction temperature was controlled between 40° C. and 50° C. by controlling the feeding rate of solid $Ca(OH)_2$ and the pH value of the solution at the end of reaction is kept at 8; after the reaction, the solution in the reactor was filtered, and the filter cake was washed with water until the content of $Cl^-$ in the filter cake was less than 0.5%; after that, the filter cake was prepared into water suspension containing 5% solid in weight percentage, and the air was charged into the solution for oxidation until the $Fe^{2+}/Fe_t$ was less than 1%, so that it was considered the composition was completed oxidized; then the suspension was filtered, and the composition containing amorphous iron oxide hydroxylamorphous iron oxide hydroxide was obtained after the filtered composition was dried at the temperature of 70° C.; wherein, the weight percentage of the amorphous iron oxide hydroxylamorphous iron oxide hydroxide in the filtered composition was 92%, and the other ingredients were $CaCl_2$ and water; the sulfur capacity of the composition was 57%. wherein, the content of $Cl^-$ was determined with mercuric thiocyanate colorimetry.

The processes for preparation and regeneration of the desulfurizer are described below:

500 g composition comprising amorphous iron oxide hydroxide with a particle size of 100 mesh, 45 g sodium carboxymethylcellulose (dissolved in advance), and 10 g wheat bran powder were mixed uniformly, kneaded with appropriate quantities of water using a small kneader, and extruded using a small twin screw extruder to yield a strip that was subsequently treated with a pill machine to yield a pill desulfurizer. The desulfurizer was roasted in an oven at 75° C. for 5 h and the sulfur capacity thereof was measured to be 54%. The desulfurizer was named desulfurizer A.

The desulfurizer A was added to a desulfurization reactor. After $H_2S$ passing through the reactor, the resultant waste mixture was unloaded, washed with water and ground in the presence of water using a wet ball mill into powders with particle size 200 mesh. An aqueous suspension of the powders was prepared with a solid weight percent of 30%, compressed air was charged into the slurry, and a sample was collected for testing after reaction for a period. When no $H_2S$ was produced from the reaction between the sample and hydrochloric acid, the iron sulfide in the suspension was determined to have been completely transformed into a slurry comprising amorphous iron oxide hydroxide and elemental sulfur. The slurry was filtered to yield a solid. The solid was placed into a flotation tank. After water, as an auxiliary agent, and water glass and kerosene were added and air was charged into the slurry, the elemental sulfur, additive, and binder were removed, together with excess air, by overflowing the tank. The precipitate at the bottom of the tank was a composition comprising amorphous iron oxide hydroxide. The overflowed elemental sulfur could be purified by extraction or other methods. The composition comprising amorphous iron oxide hydroxide was roasted at 75° C., and sodium carboxymethylcellulose (dissolved in advance) as well as wheat bran powders was added according to the proportions described above. The mixture was treated according to the method and reaction conditions described above to yield a new desulfurizer (desulfurizer B) with a sulfur capacity of 50%.

The desulfurizer B was used to desulfurize in a reactor and was unloaded after the $H_2S$ was passed. Then the desulfurizer B was regenerated according to the process described, and the regenerant of the desulfurizer B was obtained. After that, sodium carboxymethylcellulose and wheat bran powder were added according to the proportions described above. The mixture was treated in accordance with the method and reaction conditions described above to yield a new desulfurizer (desulfurizer c) with a sulfur capacity of 46.5%.

After four rounds of desulfurizing and regeneration, a fifth desulfurizer (desulfurizer E) with a sulfur capacity of 42% was obtained.

EXAMPLE 21

The process for preparing the composition containing amorphous iron oxide hydroxide comprises the following steps:

Firstly, the water solution prepared with solid $FeSO_4.7H_2O$ was put in a reactor; solid NaOH was further put into the reactor, and the mixture was stirred simultaneously; then the reaction temperature was controlled between 60° C. and 70° C. by controlling the feeding rate of solid NaOH and the pH value of the solution at the end of reaction is kept at 8.5; after the reaction, the solution in the reactor was filtered, and the filter cake was put in the air for oxidation until the $Fe^{2+}/Fe_t$ was less than 10%, so that it was considered the composition was completed oxidized; the composition was washed with water until the content of $Na^+$ was less than 1%; after that, the composition was filtered; and the composition containing amorphous iron oxide hydroxide was obtained after the filtered composition was dried at the temperature of 80° C.; wherein, the weight percentage of the amorphous iron oxide hydroxide in the filtered composition was 85%, the other ingredients were $Na_2SO_4$, water, $TiO_2$, and ferroferric oxide, and the sulfur capacity of the composition was 52%.

The processes for preparation and regeneration of the desulfurizer are described below:

500 g composition comprising amorphous iron oxide hydroxide and with a particle size of 100 mesh and 50 g cellulose powder were mixed uniformly, kneaded with appropriate quantities of water using a small kneader, and extruded using a small twin screw extruder to yield a strip that was subsequently treated using a pill machine to yield a pill desulfurizer. The desulfurizer was roasted in an oven at 80° C. for 4 h and the sulfur capacity thereof was measured to be 50%.

The desulfurizer was named desulfurizer A.

The desulfurizer A was added to a desulfurization reactor. After $H_2S$ passing through the reactor, the resultant waste mixture was unloaded, washed with water and ground in the presence of water using a wet ball mill into powders with a particle size of 200 mesh. An aqueous suspension of the powders was prepared with a solid weight percent of 15%, compressed air was charged into the suspension, and a sample was collected for testing after reaction for a period. When no $H_2S$ was produced from the reaction between the sample and hydrochloric acid, the iron sulfide in the suspension was determined to have been completely transformed into a slurry comprising amorphous iron oxide hydroxide and elemental sulfur. The slurry was filtered to yield a solid that was extracted thrice with $CCl_4$. The extract was combined and distilled to yield crystalline elemental sulfur. The remaining solid after extraction was a composition comprising amorphous iron oxide hydroxide. The composition comprising amorphous iron oxide hydroxide was roasted at 70° C., and cellulose powders were added according to the proportions described above. The mixture was treated following the method and reaction conditions described above to yield a new desulfurizer (desulfurizer B) with a sulfur capacity of 46%.

The desulfurizer B was used to desulfurize in a reactor and was unloaded after the $H_2S$ was passed. Then the desulfurizer B was regenerated according to the process described, and the regenerant of the desulfurizer B was obtained. After that, cellulose powder was added according to the proportions described above. The mixture was treated in accordance with the method and reaction conditions described above to yield a new desulfurizer (desulfurizer c) with a sulfur capacity of 43.5%.

EXAMPLE 22

400 g regenerated desulfurizer E from Example 1 and 100 g prepared composition A comprising amorphous iron oxide hydroxide from Example 1 with a particle size of 100 mesh, 35 g sesbania powder, and 20 g sawdust powder were mixed uniformly, kneaded with appropriate quantities of water using a small kneader, and extruded using a small twin screw extruder to yield a strip desulfurizer. The desulfurizer was dried naturally for 10 h and the sulfur capacity thereof was measured to be 43%.

In the above examples, the sulfur capacity was measured using a standard gas containing 40,000 ppm $H_2S$ at normal temperatures (between −5° C. and 45° C.) and normal pressures (generally, one atmospheric pressure). Sulfur was quantitatively measured using a WK-2C integrated microcoulometer (manufactured by Jiangsu Electroanalytical Instrument Factory), which had a minimal measurement volume of 0.2 ppm.

In this invention, it should be noted that the soluble ferrous salt is not limited to that disclosed in the examples and further comprises other ferrous salt such as $FeSO_4.7H_2O$, $FeCl_2.4H_2O$, and $Fe(NO_3)_2.6H_2O$. The desulfurizer can be regenerated only if it comprises a composition comprising amorphous iron oxide hydroxide and a binder, no matter what other ingredients are added. So the desulfurizer comprising a composition comprising amorphous iron oxide hydroxide and a binder falls within the scope of the invention.

While particular embodiments of the invention have been shown and described, it will be obvious to those skilled in the art that changes and modifications may be made without departing from the invention in its broader aspects, and, therefore, the aim of the appended claims is to cover all such changes and modifications as fall within the true spirit and scope of the invention.

The invention claimed is:

1. A method for preparing a composition comprising amorphous iron oxide hydroxide, comprising the following steps:
   a. preparing a solution comprising a ferrous salt;
   b. mixing the solution comprising a ferrous salt with a hydroxide solution or a solid hydroxide to form a first mixture, and reacting the first mixture at a temperature not exceeding 70° C. to yield a second mixture;
   c. filtering the second mixture to remove generated soluble salt and yield a filter cake, and washing the filter cake with water; and
   d. forming a suspension comprising the filter cake, charging the suspension with a gas comprising oxygen, and then filtering and drying the suspension to yield the composition comprising amorphous iron oxide hydroxide.

2. The method of claim 1, wherein the hydroxide in the hydroxide solution or the solid hydroxide is an alkali hydroxide.

3. The method of claim 1, wherein a pH value of the second mixture is between 7.5 and 8.5.

4. The method of claim 1, wherein the temperature does not exceed 50° C.

5. The method of claim 2, wherein alkali cations constitute less than 0.5 weight % of the filter cake after the filter cake is washed with water.

6. The method of claim 1, wherein the filter cake constitutes between 5 weight % to 30 weight % of the suspension.

7. The method of claim 6, wherein the filter cake constitutes between 10 weight % to 15 weight % of the suspension.

8. The method of claim 1, wherein the temperature at which the drying of the suspension is carried out does not exceed 100° C.

9. The method of claim 1, wherein the gas comprising oxygen is air.

10. The method of claim 1, further comprising charging the suspension with the gas comprising oxygen until the weight proportion of $Fe^{2+}/Fe_t$ is less than 1%.

11. The method of claim 1, wherein the amorphous iron oxide hydroxide constitutes between 65 weight % and 100 weight % of the composition.

* * * * *